United States Patent
Bhaowal et al.

(10) Patent No.: US 12,361,325 B2
(45) Date of Patent: *Jul. 15, 2025

(54) AUTOMATIC GENERATION OF AN EXPLANATION, BASED ON DATA LINEAGE AND USER FEEDBACK, OF A PREDICTION PRODUCED BY A MACHINE LEARNING SYSTEM

(71) Applicant: Salesforce, Inc., San Francisco, CA (US)

(72) Inventors: Mayukh Bhaowal, San Francisco, CA (US); Leah McGuire, Redwood City, CA (US); Kin Fai Kan, Sunnyvale, CA (US); Christopher Rupley, San Francisco, CA (US); Xiaodan Sun, San Francisco, CA (US); Michael Weil, San Francisco, CA (US); Shubha Nabar, Sunnyvale, CA (US)

(73) Assignee: Salesforce, Inc., San Francisco, CA (US)

(*) Notice: Subject to any disclaimer, the term of this patent is extended or adjusted under 35 U.S.C. 154(b) by 174 days.

This patent is subject to a terminal disclaimer.

(21) Appl. No.: 18/140,400

(22) Filed: Apr. 27, 2023

(65) Prior Publication Data

US 2023/0259824 A1    Aug. 17, 2023

Related U.S. Application Data

(63) Continuation of application No. 16/542,228, filed on Aug. 15, 2019, now Pat. No. 11,669,767.

(Continued)

(51) Int. Cl.
*G06F 18/00* (2023.01)
*G06F 18/21* (2023.01)
(Continued)

(52) U.S. Cl.
CPC .......... *G06N 20/00* (2019.01); *G06F 18/2148* (2023.01); *G06F 18/2185* (2023.01); *G06N 5/045* (2013.01)

(58) Field of Classification Search
CPC .......... G06N 20/00; G06N 5/045; G06N 5/01; G06F 18/2148; G06F 18/2185; G06Q 10/0637

(Continued)

(56) References Cited

U.S. PATENT DOCUMENTS 9,092,742 B1    7/2015    Zeng
9,460,401 B2 *  10/2016   Zeng ...................... G06N 3/084
(Continued)

FOREIGN PATENT DOCUMENTS

WO    WO-2015027315 A1 *  3/2015    ....... G06F 17/30675
WO        2019152426 A1     8/2019

OTHER PUBLICATIONS https://en.wikipedia.org/wiki/Likert_scale (Year: 2024).*

*Primary Examiner* — Russell S Glass
(74) *Attorney, Agent, or Firm* — Butzel Long; Aaron S. Kamlay

(57) ABSTRACT

A set of data for training a machine learning system can be modified to improve its performance. An item of information can be transmitted. A message can be transmitted that includes an explanation of a determination, by the machine learning system, to transmit the item of information from among a plurality of items of information. A first set of data can have been used to train the machine learning system. A signal can be received that includes an indication of a usefulness of the message, to a user of a user device, in making a decision to perform an action based on a knowledge associated with the item of information. The first set of data can be modified, in response to a receipt of the signal, to produce a second set of data. The machine learning (Continued)

system can be caused to be trained using the second set of data.

23 Claims, 14 Drawing Sheets

Related U.S. Application Data

(60) Provisional application No. 62/764,655, filed on Aug. 15, 2018.

(51) Int. Cl.
*G06F 18/214* (2023.01)
*G06N 5/045* (2023.01)
*G06N 20/00* (2019.01)

(58) Field of Classification Search
USPC .......................................................... 706/21
See application file for complete search history.

(56) References Cited

U.S. PATENT DOCUMENTS

| | | | |
|---|---|---|---|
| 9,569,735 | B1 | 2/2017 | Zhu |
| 11,295,375 | B1 | 4/2022 | Chitrapura |
| 11,669,767 | B2 * | 6/2023 | Bhaowal ............. G06F 18/2185 706/21 |
| 2012/0084120 | A1 * | 4/2012 | Hirsch ................... G06Q 30/02 705/7.32 |
| 2013/0218634 | A1 * | 8/2013 | Hills ...................... G06Q 30/02 705/7.29 |
| 2014/0075004 | A1 | 3/2014 | Van Dusen |
| 2015/0350144 | A1 | 12/2015 | Zeng |
| 2016/0071118 | A1 * | 3/2016 | Chiao ................. G06Q 10/067 705/7.29 |
| 2018/0219830 | A1 | 8/2018 | O'Brien |
| 2020/0279280 | A1 | 9/2020 | Ziaee |
| 2021/0042800 | A1 | 2/2021 | Chandra |
| 2021/0042810 | A1 | 2/2021 | Bentubo |
| 2021/0103858 | A1 * | 4/2021 | Padmanabhan ... G06F 18/24765 |

* cited by examiner

| Lead No. | Date Became Lead | Name | Location | Annual Revenue ($M) | Type | Customer? | Customer No. | Customership Determination Date |
|---|---|---|---|---|---|---|---|---|
| 001 | 02122018 | Al Alpha | New York | 36 | commercial | Y | 01 | 12122018 |
| 002 | 04122018 | Bo Bravo | Boston | 15 | commercial | N | | 14122018 |
| 003 | 07122018 | Cy Charles | Los Angeles | 12 | residential | N | | 17122018 |
| 004 | 11122018 | Dan Delta | Chicago | 40 | residential | Y | 03 | 19122018 |
| 005 | 16122018 | Ed Echo | Houston | 11 | commercial | N | | 26122018 |
| 006 | 17122018 | Fred Foxtrot | Detroit | 13 | commercial | Y | 02 | 18012019 |
| 007 | 19122018 | Gus Golf | Miami | 5 | residential | Y | 04 | 29122018 |
| 008 | 21122018 | Hal Hotel | Seattle | 9 | residential | N | | 30122018 |
| 009 | 26122018 | Izzy India | Phoenix | 8 | commercial | | | |
| 010 | 31122018 | Joe Juliet | St. Paul | 14 | residential | | | |

FIG. 3

| Lead No. | Date Became Lead | Name | Location | Annual Revenue ($M) | Type | Customer? | Customer No. | Customership Determination Date | Region | > $10M? | > $10M and snow? | > $10M and Commercial? | Likelihood of Conversion |
|---|---|---|---|---|---|---|---|---|---|---|---|---|---|
| 001 | 02122018 | Al Alpha | New York | 36 | commercial | Y | 01 | 12122018 | snow | Y | Y | Y | |
| 002 | 04122018 | Bo Bravo | Boston | 15 | commercial | N | | 14122018 | snow | Y | Y | Y | |
| 003 | 07122018 | Cy Charles | Los Angeles | 12 | residential | N | | 17122018 | sun | Y | N | N | |
| 004 | 11122018 | Dan Delta | Chicago | 40 | residential | Y | 03 | 19122018 | snow | Y | Y | N | |
| 005 | 16122018 | Ed Echo | Houston | 11 | commercial | N | | 26122018 | sun | Y | N | Y | |
| 006 | 17122018 | Fred Foxtrot | Detroit | 13 | commercial | Y | 02 | 18012019 | snow | Y | Y | Y | |
| 007 | 19122018 | Gus Golf | Miami | 5 | residential | Y | 04 | 29122018 | sun | N | N | N | |
| 008 | 21122018 | Hal Hotel | Seattle | 9 | commercial | N | | 30122018 | snow | N | N | N | |
| 009 | 26122018 | Izzy India | Phoenix | 8 | residential | | | | sun | N | N | N | 0.33 |
| 010 | 31122018 | Joe Juliet | St. Paul | 14 | residential | | | | snow | Y | Y | N | 0.75 |

FIG. 4

| Field of the Second Set of Fields | Field(s) Derived From |
|---|---|
| Region | Location |
| > $10M? | Annual Revenue ($M) |
| > $10M and Snow? | > $10M? and Region |
| > $10M and Commercial? | > $10M? and Type |

FIG. 5

| Lead No. | Date Became Lead | Name | Location | Annual Revenue ($M) | Type | Customer? | Customer No. | Customership Determination Date | Region | > $10M? | > $10M and Snow? | > $10M and Commercial? | Likelihood of Conversion |
|---|---|---|---|---|---|---|---|---|---|---|---|---|---|
| 001 | 02122018 | Al Alpha | New York | 36 | commercial | Y | 01 | 12122018 | snow | Y | Y | Y | |
| 002 | 04122018 | Bo Bravo | Boston | 15 | commercial | N | | 14122018 | snow | Y | Y | Y | |
| 003 | 07122018 | Cy Charles | Los Angeles | 12 | residential | N | | 17122018 | sun | Y | N | N | |
| 004 | 11122018 | Dan Delta | Chicago | 40 | residential | Y | 03 | 19122018 | snow | Y | Y | N | |
| 005 | 16122018 | Ed Echo | Houston | 11 | commercial | N | | 26122018 | sun | Y | N | Y | |
| 006 | 17122018 | Fred Foxtrot | Detroit | 13 | commercial | Y | 02 | 18012019 | snow | Y | Y | Y | |
| 007 | 19122018 | Gus Golf | Miami | 5 | residential | Y | 04 | 29122018 | sun | N | N | N | |
| 008 | 21122018 | Hai Hotel | Seattle | 9 | residential | N | | 30122018 | snow | N | N | N | |
| 009 | 26122018 | Izzy India | Phoenix | 8 | commercial | Y | 05 | 03012019 | sun | N | N | N | 0.33 |
| 010 | 31122018 | Joe Juliet | St. Paul | 14 | residential | N | | 14012019 | snow | Y | Y | N | 0.75 |

FIG. 6

| Lead No. | Date Became Lead | Name | Location | Annual Revenue ($M) | Type | Customer? | Customer No. | Customership Determination Date | Region | > $10M? | > $10M and Snow? | > $10M and Commercial? | Likelihood of Conversion |
|---|---|---|---|---|---|---|---|---|---|---|---|---|---|
| 001 | 02122018 | Al Alpha | New York | 36 | commercial | Y | 01 | 12122018 | snow | Y | Y | Y | |
| 002 | 04122018 | Bo Bravo | Boston | 15 | commercial | N | | 14122018 | snow | Y | Y | Y | |
| 003 | 07122018 | Cy Charles | Los Angeles | 12 | residential | N | | 17122018 | sun | Y | N | N | |
| 004 | 11122018 | Dan Delta | Chicago | 40 | residential | Y | 03 | 19122018 | snow | Y | Y | N | |
| 005 | 16122018 | Ed Echo | Houston | 11 | commercial | N | | 26122018 | sun | Y | N | Y | |
| 006 | 17122018 | Fred Foxtrot | Detroit | 13 | commercial | Y | 02 | 18012019 | snow | Y | Y | Y | |
| 007 | 19122018 | Gus Golf | Miami | 5 | residential | Y | 04 | 29122018 | sun | N | N | N | 0.33 |
| 008 | 21122018 | Hai Hotel | Seattle | 9 | residential | N | | 30122018 | snow | N | N | N | 0.75 |
| 009 | 26122018 | Izzy India | Phoenix | 8 | commercial | Y | 05 | 03012019 | sun | N | N | N | 0.33 |
| 010 | 31122018 | Joe Juliet | St. Paul | 14 | residential | N | | 14012019 | snow | Y | Y | N | 0.75 |
| 011 | 16012019 | Ken Kilo | Dallas | 16 | commercial | | | | sun | Y | N | Y | 0.33 |
| 012 | 19012019 | Lou Lima | Denver | 25 | residential | | | | snow | Y | Y | N | |
| 013 | 22012019 | Max Michael | San Diego | 6 | residential | | | | sun | N | N | N | 0.60 |
| 014 | 25012019 | Nick Novo | St. Louis | 7 | commercial | | | | snow | N | N | N | |

| Lead No. | Date Became Lead | Name | Location | Annual Revenue ($M) | Type | Customer? | Customer No. | Customership Determination Date | Region | > $10M? | > $10M and Snow? | > $10M and Commercial? | Likelihood of Conversion | Fdbk for Type | Fdbk for Region | Fdbk for > $10M? | Fdbk for > $10M and Snow? | Fdbk for > $10M and Commercial? |
|---|---|---|---|---|---|---|---|---|---|---|---|---|---|---|---|---|---|---|
| 001 | 02122018 | Al Alpha | New York | 36 | commercial | Y | 01 | 12122018 | snow | Y | Y | Y | | | | | | |
| 002 | 04122018 | Bo Bravo | Boston | 15 | commercial | N | | 14122018 | snow | Y | Y | Y | | | | | | |
| 003 | 07122018 | Cy Charles | Los Angeles | 12 | residential | N | | 17122018 | sun | Y | N | N | | | | | | |
| 004 | 11122018 | Dan Delta | Chicago | 40 | residential | Y | 03 | 19122018 | snow | Y | Y | N | | | | | | |
| 005 | 16122018 | Ed Echo | Houston | 11 | commercial | N | | 26122018 | sun | Y | N | Y | | | | | | |
| 006 | 17122018 | Fred Foxtrot | Detroit | 13 | commercial | Y | 02 | 18012019 | snow | Y | Y | Y | | | | | | |
| 007 | 19122018 | Gus Golf | Miami | 5 | residential | Y | 04 | 29122018 | sun | N | N | N | | | | | | |
| 008 | 21122018 | Hai Hotel | Seattle | 9 | residential | N | | 30122018 | snow | N | N | N | 0.33 | | | | | |
| 009 | 26122018 | Izzy India | Phoenix | 8 | commercial | Y | 05 | 03012019 | sun | N | N | N | 0.75 | | | | | |
| 010 | 31122018 | Joe Juliet | St. Paul | 14 | residential | Y | 07 | 14012019 | snow | Y | Y | N | 0.33 | | | | | |
| 011 | 16012019 | Ken Kilo | Dallas | 16 | commercial | N | | 25012019 | sun | Y | N | Y | 0.75 | | | | Y | |
| 012 | 19012019 | Lou Lima | Denver | 25 | residential | Y | 06 | 21012019 | snow | Y | Y | N | 0.33 | | | Y | Y | |
| 013 | 22012019 | Max Michael | San Diego | 6 | residential | N | | 01022019 | sun | N | N | N | | N | 4 | | | N |
| 014 | 25012019 | Nick Novo | St. Louis | 7 | commercial | Y | 08 | 03022019 | snow | N | N | N | 0.60 | | | | | |

FIG. 12

| Lead No. | Date Became Lead | Name | Location | Annual Revenue ($M) | Type | Customer? | Customer No. | Customership Determination Date | Region | > $10M? | > $10M and Snow? | Likelihood of Conversion |
|---|---|---|---|---|---|---|---|---|---|---|---|---|
| 001 | 02122018 | Al Alpha | New York | 36 | commercial | Y | 01 | 12122018 | snow | Y | Y | |
| 002 | 04122018 | Bo Bravo | Boston | 15 | commercial | N | | 14122018 | snow | Y | Y | |
| 003 | 07122018 | Cy Charles | Los Angeles | 12 | residential | N | | 17122018 | sun | Y | N | |
| 004 | 11122018 | Dan Delta | Chicago | 40 | residential | Y | 03 | 19122018 | snow | Y | Y | |
| 005 | 16122018 | Ed Echo | Houston | 11 | commercial | N | | 26122018 | sun | Y | N | |
| 006 | 17122018 | Fred Foxtrot | Detroit | 13 | commercial | Y | 02 | 18012019 | snow | Y | Y | |
| 007 | 19122018 | Gus Golf | Miami | 5 | residential | Y | 04 | 29122018 | sun | N | N | |
| 008 | 21122018 | Hal Hotel | Seattle | 9 | residential | N | | 30122018 | snow | N | N | 0.33 |
| 009 | 26122018 | Izzy India | Phoenix | 8 | commercial | Y | 05 | 03012019 | sun | N | N | 0.75 |
| 010 | 31122018 | Joe Juliet | St. Paul | 14 | residential | Y | | 14012019 | snow | Y | Y | 0.33 |
| 011 | 16012019 | Ken Kilo | Dallas | 16 | commercial | Y | 07 | 25012019 | sun | Y | N | 0.75 |
| 012 | 19012019 | Lou Lima | Denver | 25 | residential | Y | 06 | 21012019 | snow | Y | Y | 0.33 |
| 013 | 22012019 | Max Michael | San Diego | 6 | residential | N | | 01022019 | sun | N | N | 0.60 |
| 014 | 25012019 | Nick Novo | St. Louis | 7 | commercial | Y | 08 | 03022019 | snow | N | N | |

AUTOMATIC GENERATION OF AN EXPLANATION, BASED ON DATA LINEAGE AND USER FEEDBACK, OF A PREDICTION PRODUCED BY A MACHINE LEARNING SYSTEM

CROSS-REFERENCE TO RELATED APPLICATIONS

This application claims, under 35 U.S.C. § 119(e), the benefit of U.S. Provisional Application No. 62/764,655, filed Aug. 15, 2018, the disclosure of which is incorporated herein in its entirety by reference.

BACKGROUND

A machine learning system can use one or more algorithms, statistical models, or both to produce, from a training set of data, a mathematical model that can predict an outcome of a future occurrence of an event. The outcome of the future occurrence of the event can be referred to as a label. A set of data can be received. The set of data can be organized as records. The records can have a set of fields. One field can correspond to an occurrence of the event. A set of records can be determined in which members of the set of records have a value for this field that is other than a null value. This value can represent the outcome of a past occurrence of the event. This set of records can be designated as a preliminary training set of data. Records other than this set of records can be designated as a scoring set of data.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementation of the disclosed subject matter. No attempt is made to show structural details in more detail than may be necessary for a fundamental understanding of the disclosed subject matter and the various ways in which it can be practiced.

FIG. 3 is a diagram illustrating an example of a first set of fields of one or more sets of records.

FIG. 4 is a diagram illustrating an example, at a first specific time, of the first set of fields of the one or more sets of records and a second set of fields of the one or more sets of records.

FIG. 5 is a diagram illustrating an example of a third set of records.

FIG. 6 is a diagram illustrating an example, at a second specific time, of the first set of fields of the one or more sets of records and the second set of fields of the one or more sets of records.

FIG. 7 is a diagram illustrating an example, at a third specific time, of the first set of fields of the one or more sets of records and the second set of fields of the one or more sets of records.

FIG. 11 is a diagram illustrating a first example, at a fourth specific time, of a fourth set of data.

FIG. 12 is a diagram illustrating a second example, at the fourth specific time, of the fourth set of data.

DETAILED DESCRIPTION

As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

A machine learning system can use one or more algorithms, statistical models, or both to produce, from a training set of data, a mathematical model that can predict an outcome of a future occurrence of an event. The outcome of the future occurrence of the event can be referred to as a label. A set of data can be received. The set of data can be organized as records. The records can have a set of fields. One field can correspond to an occurrence of the event. A set of records can be determined in which members of the set of records have a value for this field that is other than a null value. This value can represent the outcome of a past occurrence of the event. This set of records can be designated as a preliminary training set of data. Records other than this set of records can be designated as a scoring set of data.

The disclosed technologies can modify a set of data for training a machine learning system (i.e., a training set of data) to improve a performance of the machine learning system. An item of information can be transmitted to a user device. A message can be transmitted to the user device. The message can include an explanation of a determination, by the machine learning system, to transmit the item of information from among a plurality of items of information. A first set of data (i.e., a preliminary training set of data) can have been used to train the machine learning system. A signal can be received from the user device. The signal can include an indication of a usefulness of the message, to a user of the user device, in making a decision to perform an action (intended to produce a future occurrence of an event) based on a knowledge associated with the item of information. The first set of data can be modified, in response to a receipt of the signal, to produce a second set of data. The machine learning system can be caused to be trained using the second set of data (i.e., a modified training set of data).

Figure 1:
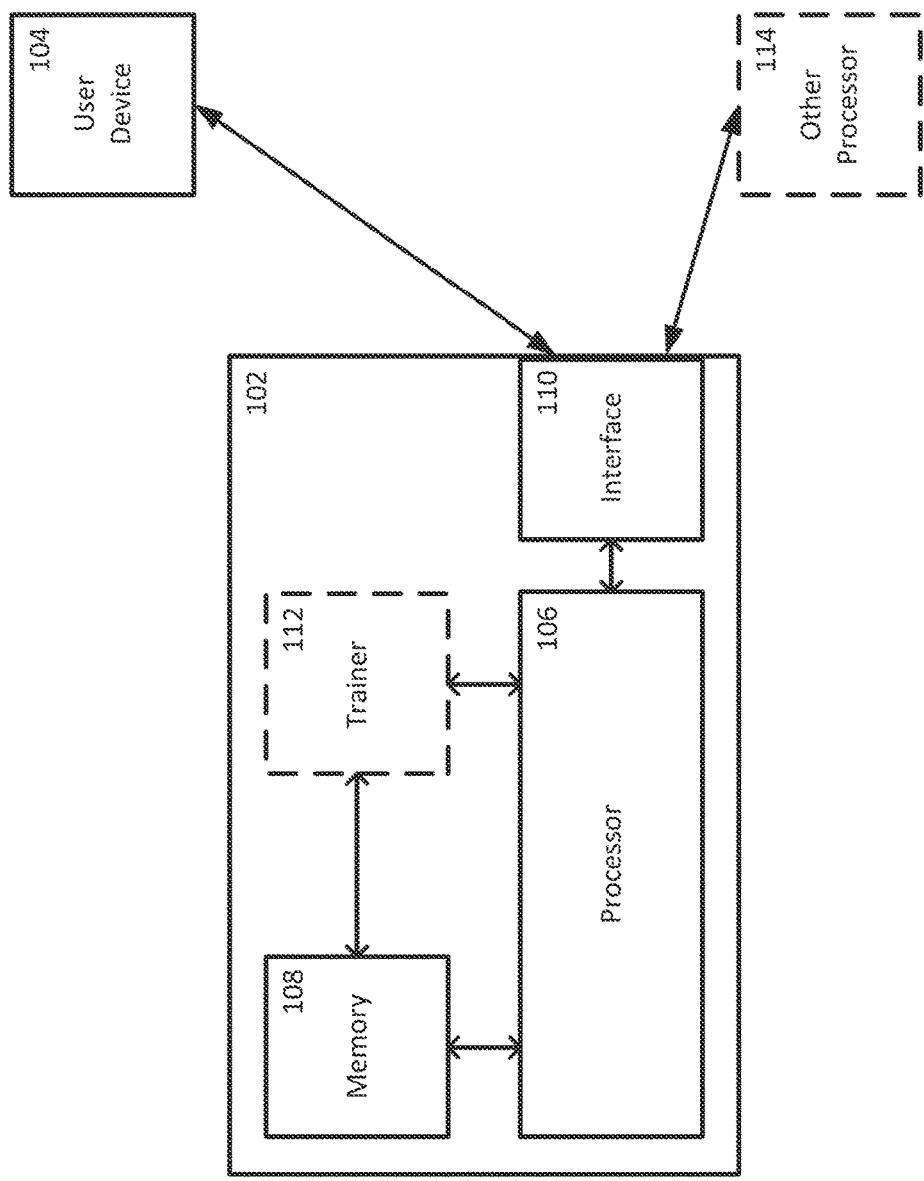
FIG. 1 is a diagram illustrating an example of an environment for modifying a set of data for training a machine learning system, according to the disclosed technologies.

FIG. 1 is a diagram illustrating an example of an environment 100 for modifying a set of data for training a machine learning system 102, according to the disclosed technologies. The environment 100 can include, for example, the machine learning system 102 and a user device 104. The machine learning system 102 can include, for example, a processor 106, a memory 108, and an interface 110. In a first example, the machine learning system 102 can further include a trainer 112. In a second example, the environment 100 can further include another processor 114.

The machine learning system 102 can be used to predict an outcome of a future occurrence of an event in a variety of settings including, for example, banking, health care, business administration, science, engineering, education, sales, or the like. For example, the machine learning system 102 can be a component of a customer relationship management (CRM) system. For illustrative purposes, the CRM system can be for a sales force for a company that manufactures roofing materials.

Figure 2A:
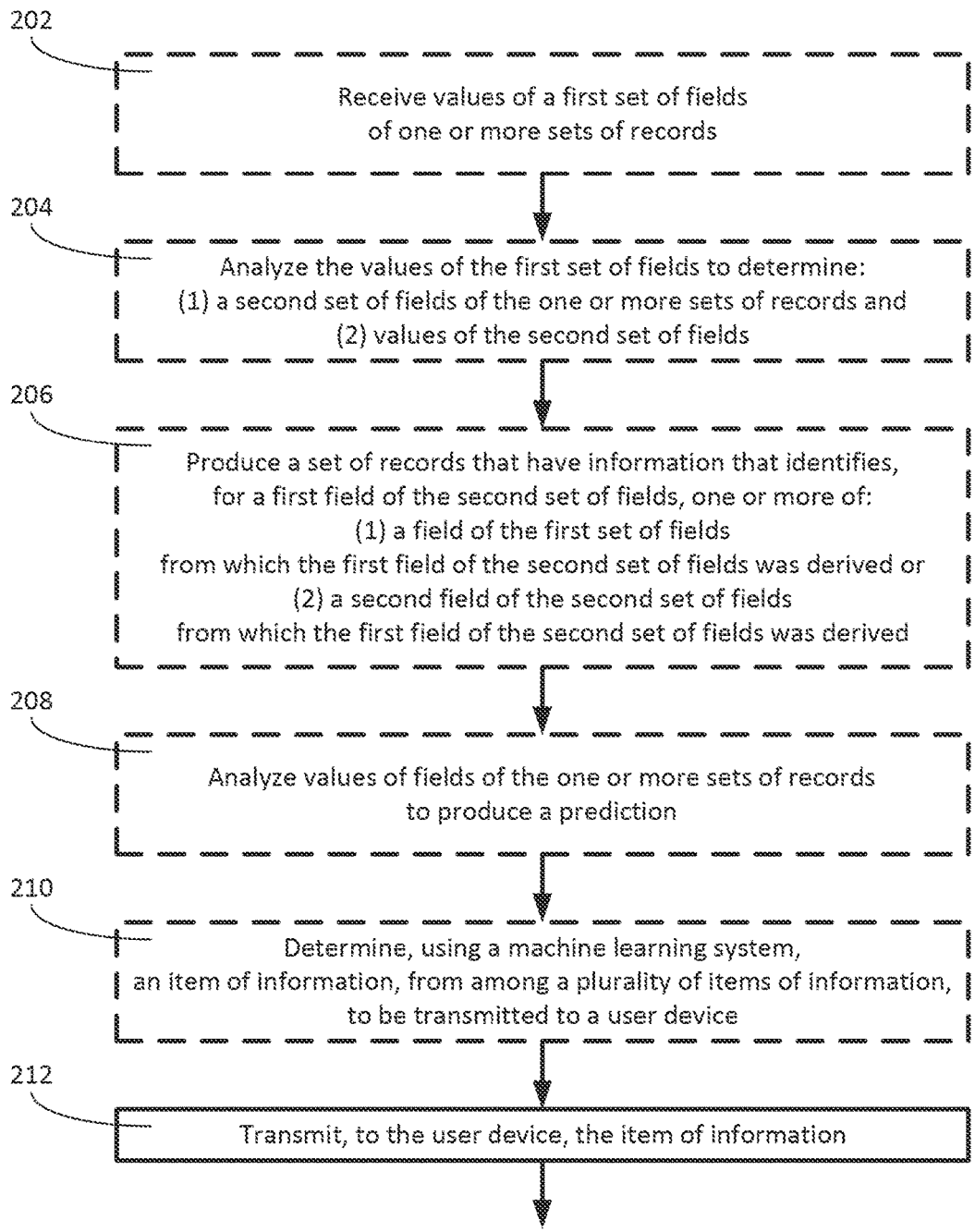
FIGS. 2A and 2B are a flow diagram illustrating an example of a method for modifying a set of data for training a machine learning system, according to the disclosed technologies.
Figure 2B:
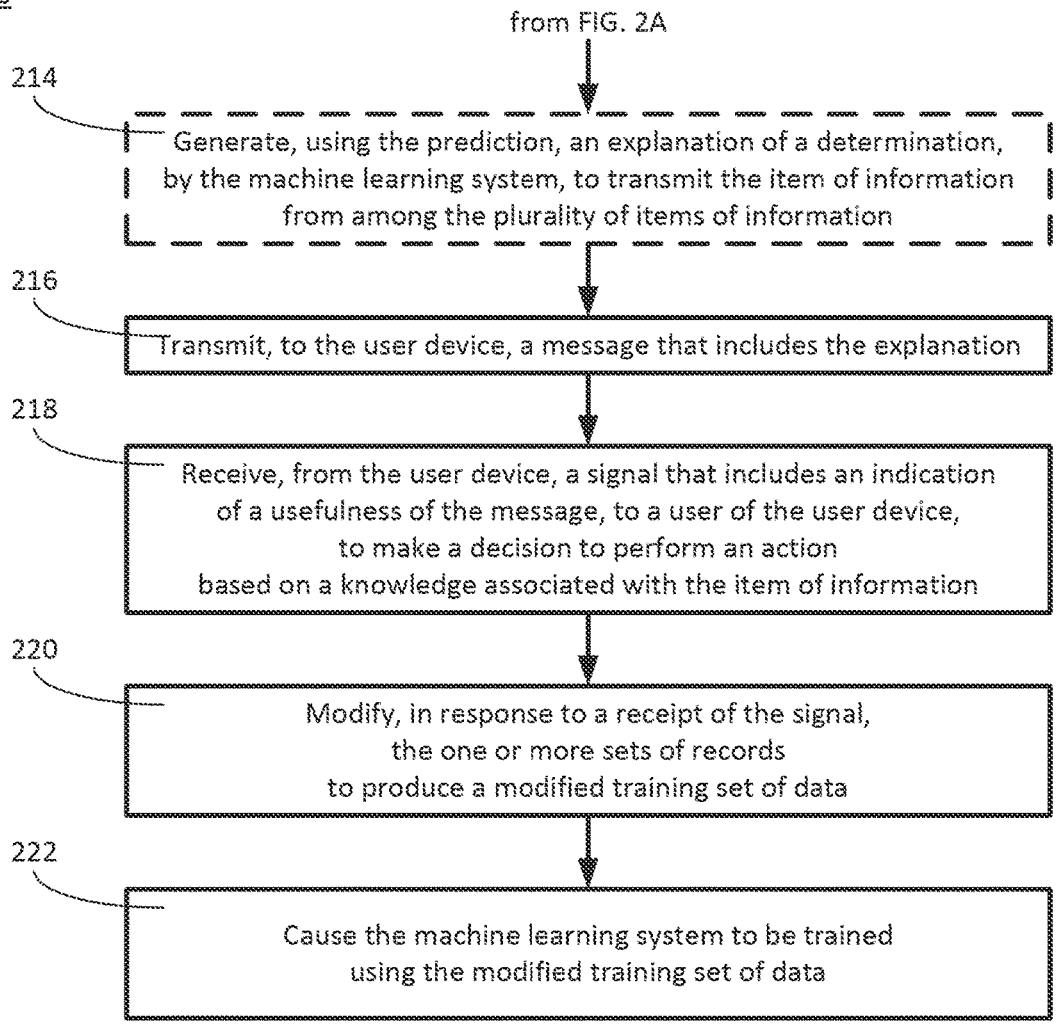

FIGS. 2A and 2B are a flow diagram illustrating an example of a method 200 for modifying a set of data for training a machine learning system, according to the disclosed technologies.

With reference to FIG. 2A, in the method 200, at an operation 202, values of a first set of fields of one or more sets of records can be received. The one or more sets of record can be for one or more sets of data FIG. 3 is a diagram illustrating an example of a first set of fields of one or more sets of records. A first set of data can include a first set of records for Lead Nos. 001 through 008. The first set of data can be used to train the machine learning system (i.e., a preliminary training set of data). A second set of data can include a second set of records for Lead Nos. 009 and 010. The second set of data can be used to score a training of the machine learning system (i.e., a scoring set of data). Each of the first set of records and the second set of records can include the first set of fields. For example, the first set of fields can include: Lead No. (a key that can identify a record of a lead), Date Became Lead (a date on which an individual was determined to be a lead), Name (a name of the individual determined to be a lead), Location (a city of a roofing company associated with the lead), Annual Revenue ($M) (a measure of the annual revenue of the company), Type (a category, commercial or residential, of the types of roofs on which the roofing company performs its services), Customer? (a Boolean value that indicates whether or not the roofing company is a customer), Customer No. (a key that can identify a record of a customer), and Customership Determination Date (a date on which a status of the roofing company as a customer or as not a customer was determined). The Customer? field can be referred to as a label. Data in the first set of fields can be referred to as raw data.

Returning to FIG. 2A, at an operation 204, the values of the first set of fields can be analyzed to determine: (1) a second set of fields of the one or more sets of data and (2) values of the second set of fields. This process can be referred to as feature engineering. For example, for a field of the first set of fields, a type of data stored in the field can be determined and, for this field, a mathematical process appropriate for the type of data can be performed. For example, the type of data can include one or more of Boolean data, numerical data, text data, categorical data, or geographic data. For example, the mathematical process can include one or more of a regression calculation, a correlation calculation, a Cramér's V calculation, a Pointwise Mutual Information calculation, or an analysis of a split in a decision tree.

FIG. 4 is a diagram illustrating an example, at a first specific time, of the first set of fields of the one or more sets of records and a second set of fields of the one or more sets of records. For example, the second set of fields can include: Region (a category, snow or sun, derived from the Location field), >$10M? (a Boolean value that indicates whether Annual Revenue is greater than $10M), >$10M and Snow? (a Boolean value that indicates whether Annual Revenue is greater than $10M and the Region of the city of the roofing company is a snow region), >$10M and Commercial? (a Boolean value that indicates whether Annual Revenue is greater than $10M and the Type of roofs on which the roofing company performs its services is a commercial type), and Likelihood of Conversion. Values in the Likelihood of Conversion field can be a numerical value that represents a prediction produced, for the second set of records (i.e., the scoring set of data), from an analysis of the one or more sets of records. The prediction can be of an outcome of a performance of an action based on a knowledge associated with an item of information in a record in the second set of records. For example, the item of information can be a name of a lead. For example, the action can include one or more of an effort to establish a communication with an entity associated with the item of information or an establishment of the communication with the entity associated with the item of information. For example, the prediction can be that the Likelihood of Conversion: (1) for Lead No. 009 was 0.33 and (2) for Lead No. 010 was 0.75.

Returning to FIG. 2A, at an operation 206, a third set of records can be produced. The third set of records can have an information that identifies, for a first field of the second set of fields, one or more of: (1) a field of the first set of fields from which the first field of the second set of fields was derived or (2) a second field of the second set of fields from which the first field of the second set of fields was derived. This process can be referred to as mapping the data lineage.

FIG. 5 is a diagram illustrating an example of the third set of records.

Returning to FIG. 4, the first set of data can be used to train the machine learning system at the first specific time. For example, the first specific time can be Dec. 31, 2018 (31122018). A first field, of the first set of records, can indicate outcomes of performances of an action based on a knowledge associated with the first set of data. For example, the first field can be the Customer? field (i.e., the label). Values of the first field of the first set of records, at the first specific time, are other than null values. Values of the first field of the second set of records, at the first specific time, are null values. For example, the machine learning system, with reference to values in the Customership Determination Date field, can be configured to determine that if a lead has not been converted to a customer within ten days of values in the Date Became Lead field, then the lead is not a customer.

FIG. 6 is a diagram illustrating an example, at a second specific time, of the first set of fields of the one or more sets of records and the second set of fields of the one or more sets of records. The second specific time can be after the first specific time. For example, the second specific time can be Jan. 14, 2019 (14012019). The second set of data can be used to score a training of the machine learning system at the second specific time. For example, with reference to values in the Customer? field (i.e., the label) at the second specific time: (1) Lead No. 009 has become a customer and (2) Lead No. 010 has not become a customer.

FIG. 7 is a diagram illustrating an example, at a third specific time, of the first set of fields of the one or more sets of records and the second set of fields of the one or more sets of records. The third specific time can be after the second specific time. For example, the third specific time can be Jan. 25, 2019 (25012019). A third set of data can include a fourth set of records for Lead Nos. 011 through 014. Values of the first field (e.g., the Customer? field (i.e., the label)) of the fourth set of records, at the third specific time, are null values. The third set of data can correspond to a plurality of items of information. For example, the plurality of items of information can be names of leads.

Returning to FIG. 2A, at an operation 208, for a record of the fourth set of records, values of fields of the one or more sets of records can be analyzed to produce a prediction. The prediction can be of an outcome of a performance of an action based on a knowledge associated with an item of information of the plurality of items of information.

Returning to FIG. 7, the prediction can be that the Likelihood of Conversion: (1) for Lead No. 011 is 0.33, (2) for Lead No. 012 is 0.75, (3) for Lead No. 013 is 0.33, and (4) for Lead No. 014 is 0.60.

Returning to FIG. 2A, at an operation 210, an item of information, from among the plurality of items of information, can be determined, using the machine learning system, to be transmitted to a user device. For example, a determination can be that the item of information is most likely, from among the plurality of items of information, to produce a desired outcome in response to the performance of the action based on the knowledge associated with the item of information.

Returning to FIG. 7, with reference to the Likelihood of Conversion field at the third specific time, Lead No. 012 is most likely, from among the plurality of items of information, to produce the desired outcome in response to the performance of the action based on the knowledge associated with the item of information.

Returning to FIG. 2A, at an operation 212, the item of information can be transmitted to the user device.

Figure 8:
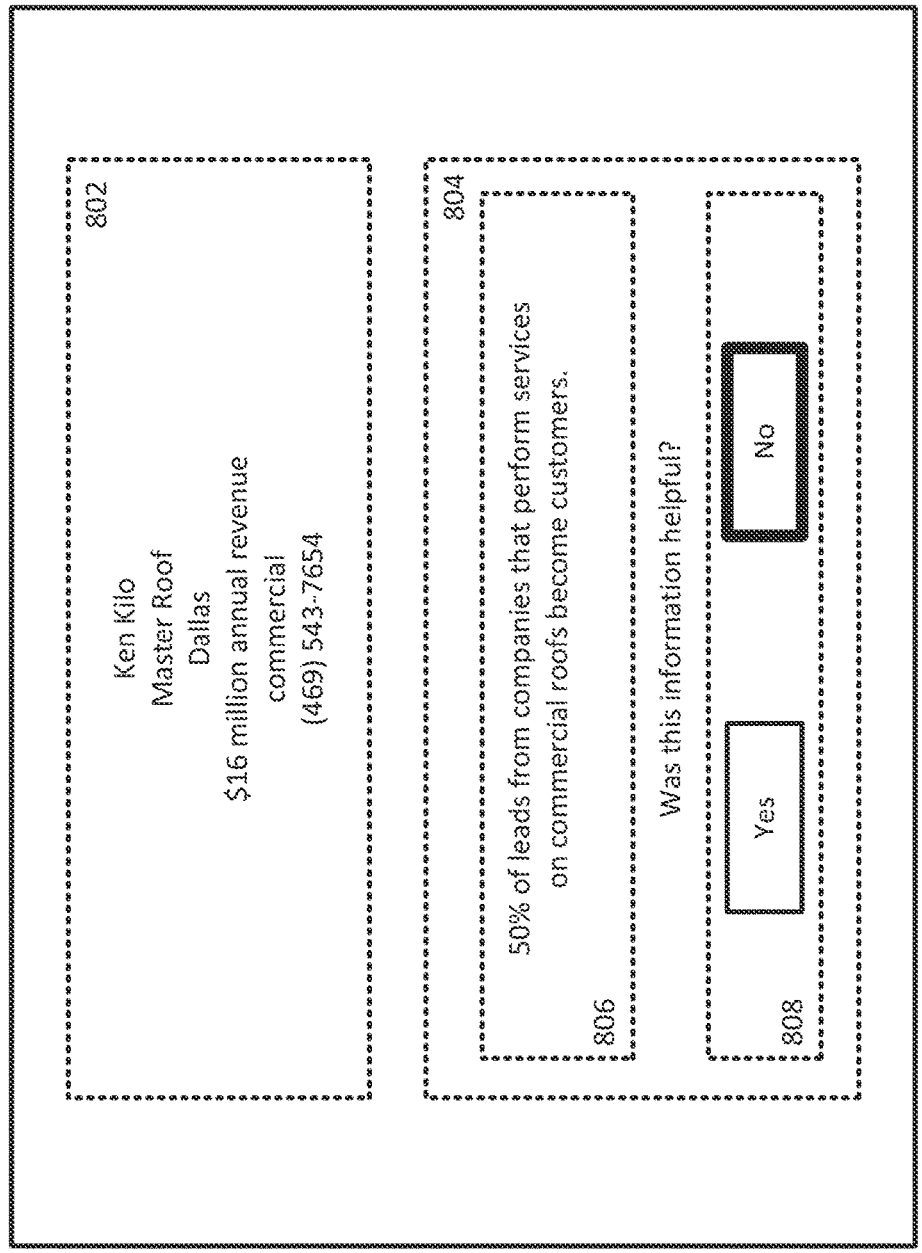
FIG. 8 is a diagram illustrating a first example of a user interface presented on a user device, according to the disclosed technologies.

FIG. 8 is a diagram illustrating a first example of a user interface 800 presented on the user device, according to the disclosed technologies. The user interface 800 can include, for example, the item of information 802.

With reference to FIG. 2B, at an operation 214, using the prediction, an explanation can be generated. The explanation can be of a determination, by the machine learning system, to transmit the item of information from among the plurality of items of information.

At an operation 216, a message can be transmitted to the user device. The message can include the explanation.

Returning to FIG. 8, the user interface 800 can include, for example, the message 804. The message 804 can include, for example, the explanation 806.

For example, information in the third set of records (produced at the operation 206) (see FIG. 5) can be used to generate the explanation. The explanation can includes phrases that provide an indication of which of the values of the fields of the one or more sets of records were used to produce the prediction. Advantageously, the explanation can provide a user of the user device with an understanding of how the machine learning system produced the prediction.

Returning to FIG. 2B, at an operation 218, a signal can be received from the user device. The signal can include an indication of a usefulness of the message, to the user of the user device, in making a decision to perform the action based on the knowledge associated with the item of information. Advantageously, the indication can provide the machine learning system with an understanding of what is significant to the user in making the decision to perform the action based on the knowledge associated with the item of information.

In a first example, the indication can include a Boolean value. Returning to FIG. 8, the message 804 can include, for example, one or more graphical control elements 808. For example, the one or more graphical control elements 808 can include a Yes button and a No button. For example, the user of the user device can use the one or more graphical control elements 808 to send the signal with the indication. For example, the user may use the No button to indicate that the information "50% of leads from companies that perform services on commercial roofs become customers." was useful in making the decision to make an effort to establish a communication with Ken Kilo of Master Roof.

In a second example: (1) the message can include a scale and (2) the indication can include a rank on the scale.

Figure 9:
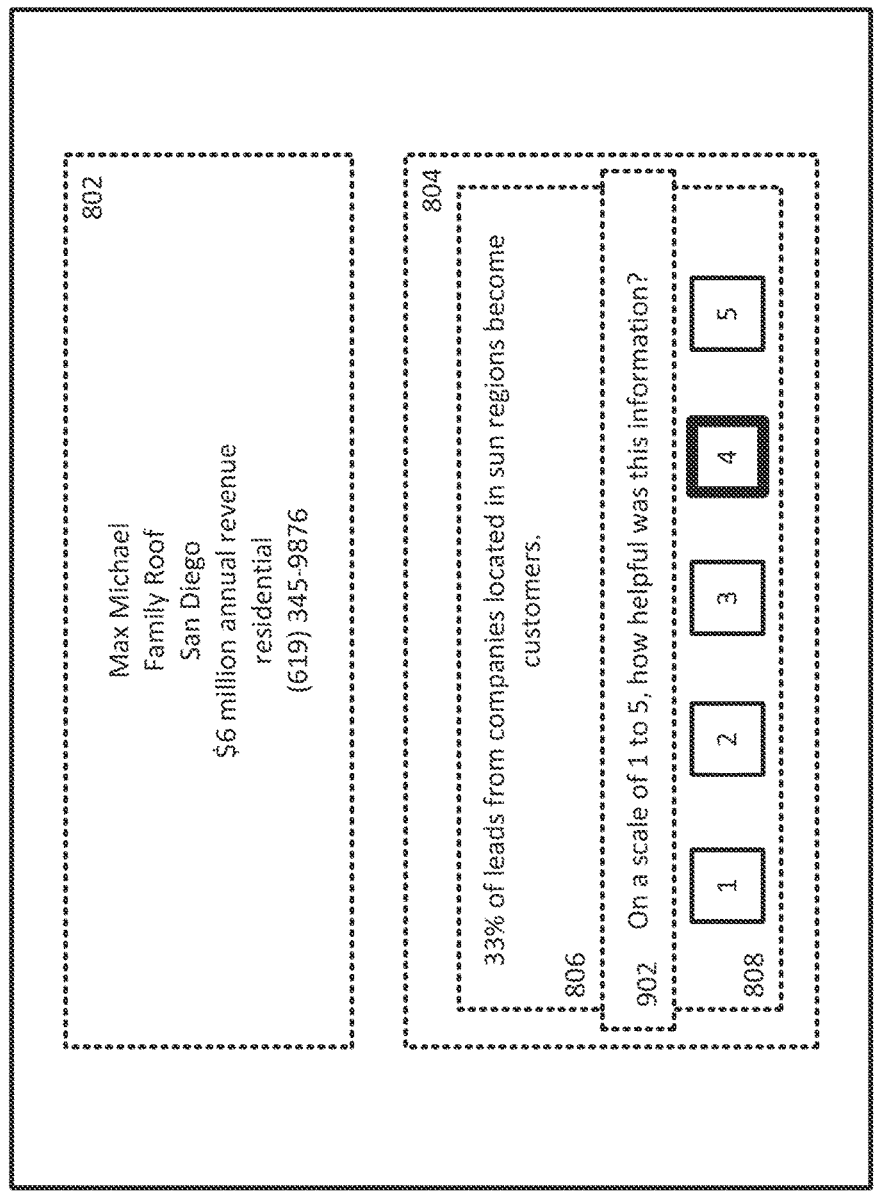
FIG. 9 is a diagram illustrating a second example of the user interface presented on the user device, according to the disclosed technologies.

FIG. 9 is a diagram illustrating a second example of the user interface 800 presented on the user device, according to the disclosed technologies. The message 804 can include, for example, the scale 902. For example, the one or more graphical control elements 808 can include a 1 button, a 2 button, a 3 button, a 4 button, and a 5 button. For example, the user of the user device can use the one or more graphical control elements 808 to send the signal with the indication. For example, the user may use the 4 button to indicate the rank of 4, on the scale of 1 to 5, as a degree of usefulness of the information "33% of leads from companies in sun regions become customers." in making the decision to make an effort to establish a communication with Max Michael of Family Roof.

In an implementation, the phrases included in the explanation can include a first phrase and a second phrase. The first phrase can provide an indication of the values of a first field of the one or more sets of records that suggest that the performance of the action based on the knowledge associated with the item of information is likely to produce a desired outcome. The second phrase can provide an indication of the values of a second field of the one or more sets of records that suggest that the performance of the action based on the knowledge associated with the item of information is likely to produce the desired outcome.

Figure 10:
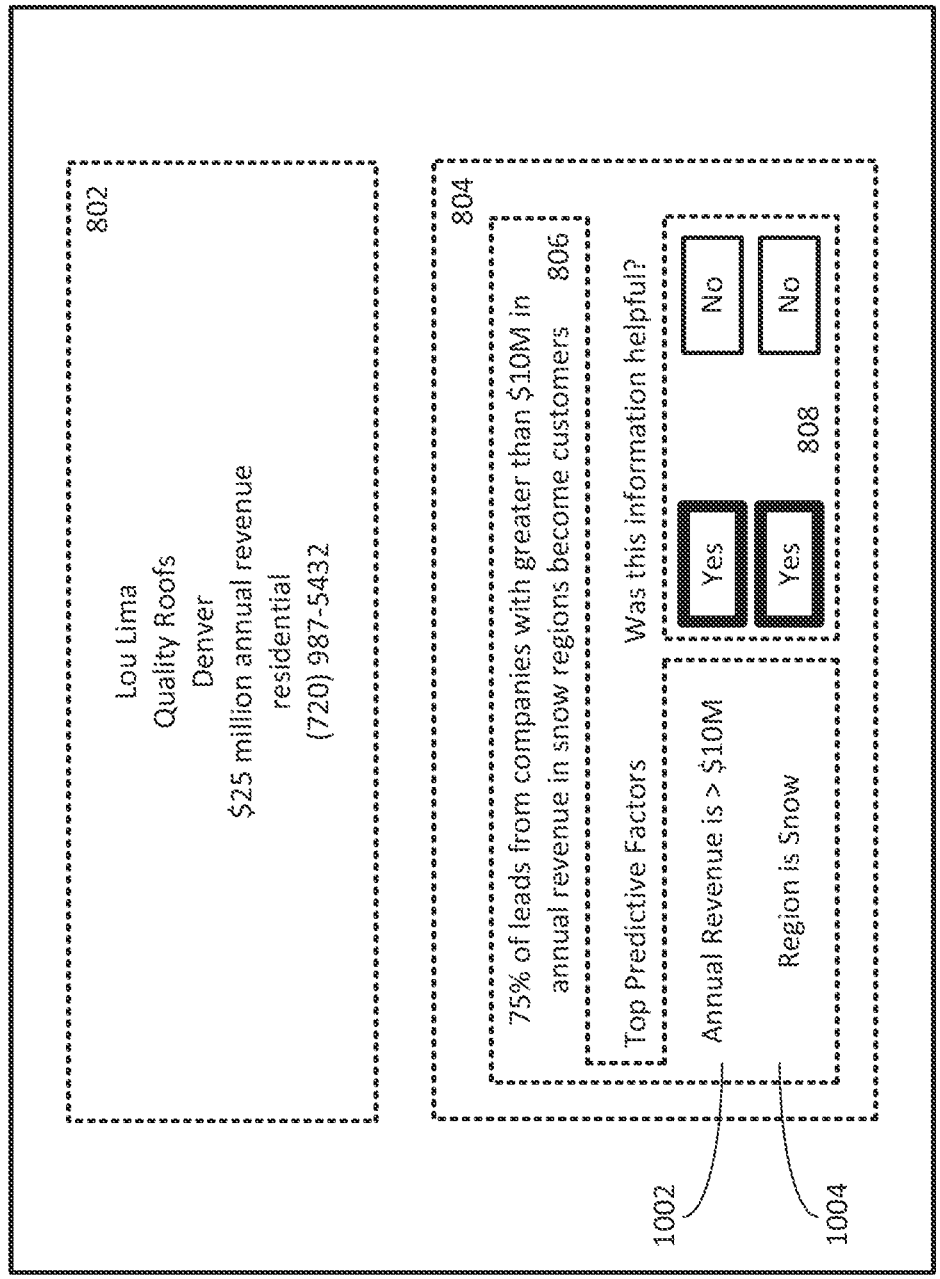
FIG. 10 is a diagram illustrating a third example of the user interface presented on the user device, according to the disclosed technologies.

FIG. 10 is a diagram illustrating a third example of the user interface 800 presented on the user device, according to the disclosed technologies. The message 804 can include, for example, the first phrase 1002 and the second phrase 1004. The first phrase 1002 can provide an indication of the values of a first field of the one or more sets of records that suggest that the performance of the action based on the knowledge associated with the item of information is likely to produce a desired outcome. The second phrase 1004 can provide an indication of the values of the fields of the one or more sets of records that suggest that the performance of the action based on the knowledge associated with the item of information is likely to produce the desired outcome. For example, each of the first phrase 1002 and the second phrase 1004 can be associated with one or more graphical control elements 808. For example, for each of the first phrase 1002 and the second phrase 1004, the one or more graphical control elements 808 can include a Yes button and a No button. For example, the user may use: (1) the Yes button to indicate that the information "Annual Revenue is >$10M" was useful in making the decision to make an effort to establish a communication with Lou Lima of Quality Roofs and (2) the Yes button to indicate that the information "Region is Snow" was useful in making the decision to make an effort to establish a communication with Lou Lima of Quality Roofs.

Returning to FIG. 2B, at an operation 220, in response to a receipt of the signal, one or more of the first set of data, the second set of data, or the third set of data can be modified to produce a fourth set of data (i.e., a modified training set of data).

In a first example, the one or more of the first set of data, the second set of data, or the third set of data can be modified by adding one or more fields to the one or more sets of records. One or more values of this one of more fields can correspond to the indication included in the signal received from the user device.

FIG. 11 is a diagram illustrating a first example, at a fourth specific time, of the fourth set of data. The fourth specific time can be after the third specific time. For example, the fourth specific time can be Feb. 3, 2019 (03022019). The fourth set of data can be used to train, at a time after the fourth specific time, the machine learning system. For example, with reference to values in the Customer? field at the fourth specific time: (1) Lead No. 011 has become a customer, (2) Lead No. 012 has become a customer, (3) Lead No. 013 has not become a customer, and (4) Lead No. 014 has become a customer. In the first example of the fourth set of data, one or more fields can be added to the one or more sets of records. For example, the one or more sets of records can include: (1) a Feedback for Type field, (2) a Feedback for Region field, (3) a Feedback for >10M? field, (4) a Feedback for >$10M and Snow? field, and (5) a Feedback for >$10M and Commercial? field. Values of these feedback fields, at the fourth specific time, are: (1) null values for Lead Nos. 001 through 010 (which were not a subject of the indication included in the signal received from the user device) and (2) other than null values for Lead Nos. 011 through 014 (which were the subject of the indication included in the signal received from the user device). With reference to FIGS. 8 and 11, for example, for Lead No. 011, the Feedback for Type field can have a value of No. Additionally, for example, the Feedback for >$10M and Commercial field can have a value of No. With reference to FIGS. 9 and 11, for example, for Lead No. 013, the Feedback for Region field can have a value of 4. (This is for illustrative purposes. In an actual implementation, Boolean and numeric values would be entered in different fields.) With reference to FIGS. 10 and 11, for example, for Lead No. 012, the Feedback for Region field can have a value of Yes and the Feedback for >$10M? field can have a value of Yes. Additionally, for example, the Feedback for >$10M and Snow? field can have a value of Yes.

In a second example, the one or more of the first set of data, the second set of data, or the third set of data can be modified by excluding, in response to the indication, one or more fields from the one or more sets of records. That is, although such one or more fields can remain in the one or more of the first set of data, the second set of data, or the third set of data, such one or more fields can be excluded from the fourth set of data (i.e., a modified training set of data).

FIG. 12 is a diagram illustrating a second example, at the fourth specific time, of the fourth set of data. For example, in response to the indication included in the signal, it can be determined that one or more of the fields of the one or more sets of records may not significantly effect a performance of the machine learning system. For example, as described above with reference to FIG. 8, in response to a receipt of the No indication with respect to the usefulness of the information "50% of leads from companies that perform services on commercial roofs become customers." in making the decision to make an effort to establish a communication with Ken Kilo of Master Roof, it can be determined that the >$10M and Commercial? field may not significantly effect the performance of the machine learning system. Accordingly, the one or more of the first set of data, the second set of data, or the third set of data can be modified by excluding, in response to the indication, the >$10M and Commercial? field from the fourth set of data (i.e., a modified training set of data).

Advantageously, the disclosed technologies can use a fewer number of memory cells than conventional approaches to producing the training set of data. FIGS. 4, 6, and 7 are diagrams illustrating examples of conventional training sets of data. A conventional training set of data can use a first number of memory cells (see FIG. 7). A modified training set of data, according the disclosed technologies, can use a second number of memory cells (see FIG. 12). The second number can be less than the first number. Moreover, an actual implementation of the conventional training set of data can include more memory cells than illustrated in FIG. 7 because one or more fields of the second set of fields likely would be determined, but excluded from the modified training set of data illustrated in FIG. 12, according to the disclosed technologies. An actual implementation of operations to train a machine learning system can involve hundreds of fields, of the first set of fields, for which thousands of fields, of the second set of fields, can be determined. Furthermore, the approach used by the disclosed technologies is contrary to the conventional practice taught to data scientists to preserve fields for inclusion in the mathematical model.

Returning to FIG. 2B, at an operation 222, the machine learning system can be caused to be trained using the fourth set of data (i.e., a modified training set of data).

In a first example, the machine learning system can be caused to be trained in response to a variable being equal to or greater than a threshold value.

For example, the signal received from the user device can include a plurality of signals received from one or more user devices, the variable can include a count of the signals, and the threshold value can include a specific number of signals.

Additionally or alternatively, the action based on the knowledge associated with the item of information can include a plurality of actions based on the knowledge associated with the plurality of items of information, the variable can include a count of undesired outcomes in response to performances of the actions, and the threshold value can include a specific number of undesired outcomes.

Additionally or alternatively, the item of information can be transmitted at a specific time, the variable can include a duration of time after the specific time, and the threshold value can include a specific duration of time.

In a second example, the machine learning system can be caused to be trained by conveying, to another processor, the fourth set of data. For example, with reference to FIG. 1, the environment 100 can include the other processor 114.

In a third example, the machine learning system can be caused to be trained by training, using the fourth set of data, the machine learning. For example, with reference to FIG. 1, the machine learning system 102 can include the trainer 112.

In light of the technologies described above, one of skill in the art understands that modifying a set of data for training a machine learning system to improve a performance of the machine learning system can include any combination of some or all of the foregoing configurations.

Figure 13:
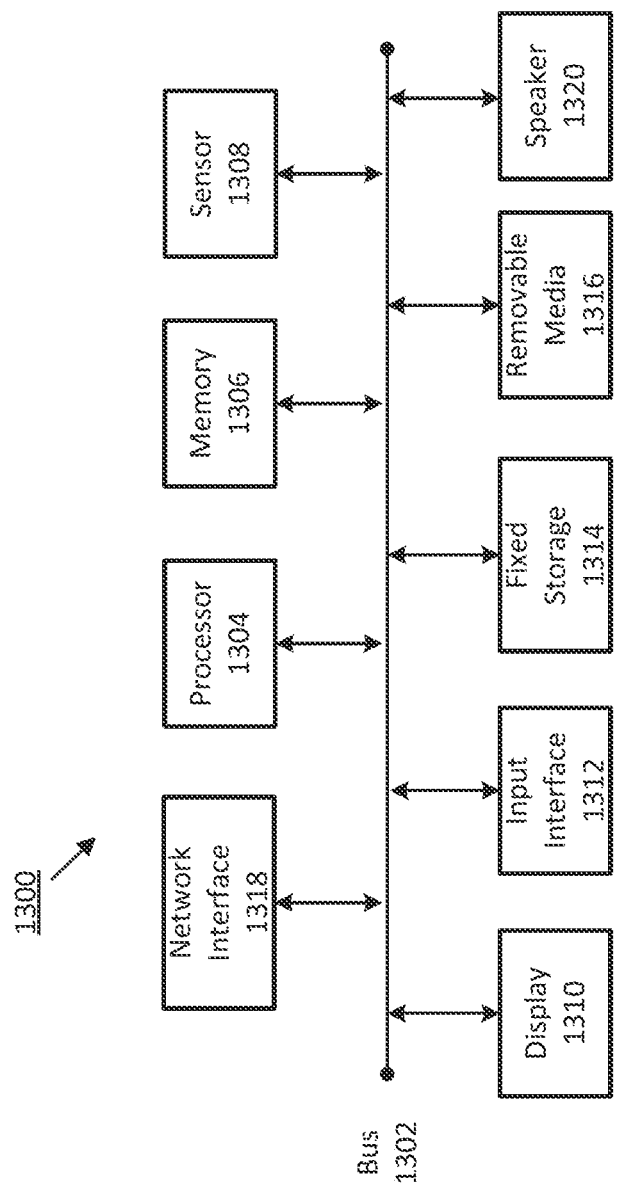
FIG. 13 is a block diagram of an example of a computing device suitable for implementing certain devices, according to the disclosed technologies.

FIG. 13 is a block diagram of an example of a computing device 1300 suitable for implementing certain devices, according to the disclosed technologies. The computing device 1300 can be constructed as a custom-designed device or can be, for example, a special-purpose desktop computer, laptop computer, or mobile computing device such as a smart phone, tablet, personal data assistant, wearable technology, or the like.

The computing device 1300 can include a bus 1302 that interconnects major components of the computing device 1300. Such components can include a central processor 1304, a memory 1306 (such as Random Access Memory (RAM), Read-Only Memory (ROM), flash RAM, or the like), a sensor 1308 (which can include one or more sensors), a display 1310 (such as a display screen), an input interface 1312 (which can include one or more input devices such as a keyboard, mouse, keypad, touch pad, turn-wheel, and the like), a fixed storage 1314 (such as a hard drive, flash storage, and the like), a removable media component 1316 (operable to control and receive a solid-state memory device, an optical disk, a flash drive, and the like), a network interface 1318 (operable to communicate with one or more remote devices via a suitable network connection), and a speaker 1320 (to output an audible communication). In some embodiments the input interface 1312 and the display 1310 can be combined, such as in the form of a touch screen.

The bus 1302 can allow data communication between the central processor 1304 and one or more memory components 1314, 1316, which can include RAM, ROM, or other memory. Applications resident with the computing device 1300 generally can be stored on and accessed via a computer readable storage medium.

The fixed storage 1314 can be integral with the computing device 1300 or can be separate and accessed through other interfaces. The network interface 1318 can provide a direct connection to the premises management system and/or a remote server via a wired or wireless connection. The network interface 1318 can provide such connection using any suitable technique and protocol, including digital cellular telephone, WiFi™, Thread®, Bluetooth®, near field communications (NFC), and the like. For example, the network interface 1318 can allow the computing device 1300 to communicate with other components of the premises management system or other computers via one or more local, wide-area, or other communication networks.

The foregoing description, for purpose of explanation, has been described with reference to specific configurations. However, the illustrative descriptions above are not intended to be exhaustive or to limit configurations of the disclosed technologies to the precise forms disclosed. Many modifications and variations are possible in view of the above teachings. The configurations were chosen and described in order to explain the principles of configurations of the disclosed technologies and their practical applications, to thereby enable others skilled in the art to utilize those configurations as well as various configurations with various modifications as may be suited to the particular use contemplated.

The invention claimed is:

1. A method for modifying a set of data for training a machine learning system, the method comprising:
   causing, by a processor, the machine learning system to be trained using a first set of data;
   determining by the machine learning system to transmit to a user device, customer relationship management (CRM) record data from among a plurality of sales leads;
   transmitting, by the processor and to the user device, a message, wherein the message includes an explanation of the determination, by the machine learning system, to transmit the CRM record data from among the plurality of sales leads;
   receiving, by the processor, a signal, wherein the signal includes an indication of a usefulness of the message to a user of the user device, in making a decision to perform an action based on a knowledge associated with the CRM record data;
   modifying, by the processor and in response to a receipt of the signal, the first set of data to produce a second set of data; and
   providing, by the processor, the second set of data configured to update the machine learning system for subsequent CRM record information predictions.

2. The method of claim 1, further comprising determining, by the processor and using the machine learning system, to transmit, to the user device, the CRM record data from among the plurality of sales leads.

3. The method of claim 1, wherein the determination comprises a determination that the CRM record data is most likely, from among the plurality of sales leads, to produce a desired outcome in response to a performance of the action based on the knowledge associated with the CRM record data.

4. The method of claim 1, wherein the first set of data was used to train the machine learning system at a first specific time, the first set of data comprises a first set of records, the first set of records has a first field, the first field, of the first set of records, indicates outcomes of performances of the action based on knowledge associated with the first set of data, and values of the first field of the first set of records, at the first specific time, are other than null values.

5. The method of claim 4, wherein a third set of data is used to score, at a second specific time, a training of the machine learning system, the third set of data comprises a second set of records, the second set of records has the first field, the first field, of the second set of records, indicates outcomes of performances of the action based on knowledge associated with the third set of data, values of the first field of the second set of records, at the first specific time, are null values, and the second specific time is after the first specific time.

6. The method of claim 5, wherein the transmitting the CRM record data comprises transmitting the CRM record data at a third specific time, the plurality of sales leads correspond to a fourth set of data, the fourth set of data comprises a third set of records, the third set of records has the first field, the first field, of the third set of records, indicates outcomes of performances of the action based on knowledge associated with the plurality of sales leads, values of the first field of the third set of records, at the third specific time, are null values, and the third specific time is after the second specific time.

7. The method of claim 6, further comprising:
   analyzing, by the processor, values of fields of at least the first set of records, the second set of records, or the third set of records to produce a prediction, the prediction being of an outcome of a performance of the action based on the knowledge associated with the CRM record data; and
   generating, by the processor and using the prediction, the explanation.

8. The method of claim 7, further comprising:
   receiving, by the processor, values of a first set of fields of the fields of the at least the first set of records, the second set of records, or the third set of records; and
   analyzing, by the processor, the values of the first set of fields to determine:
   a second set of fields of the fields of the at least the first set of records, the second set of records, or the third set of records; and
   values of the second set of fields.

9. The method of claim 8, wherein the analyzing the values of the first set of fields comprises:

determining, for a field of the first set of fields, a type of data stored in the field; and performing, for the field, a mathematical process appropriate for the type of data.

10. The method of claim 9, wherein:

the type of data comprises at least one of Boolean data, numerical data, text data, categorical data, or geographic data; and the mathematical process comprises at least one of a regression calculation, a correlation calculation, a Cramér's V calculation, a Pointwise Mutual Information calculation, or an analysis of a split in a decision tree.

11. The method of claim 7, further comprising producing, by the processor, a fourth set of records, the fourth set of records having an information that identifies, for a first field of the second set of fields, at least one of:

a field of the first set of fields from which the first field of the second set of fields was derived; or a second field of the second set of fields from which the first field of the second set of fields was derived.

12. The method of claim 11, wherein the prediction is stored in a field of the second set of fields, the generating the explanation comprises using the information in the fourth set of records to generate the explanation, and the explanation includes phrases that provide an indication of which of the values of the fields of the at least the first set of records, the second set of records, or the third set of records were used to produce the prediction.

13. The method of claim 12, wherein the phrases include a first phrase and a second phrase, the first phrase provides an indication of the values of a first field of the at least the first set of records, the second set of records, or the third set of records that suggest that the performance of the action based on the knowledge associated with the CRM record data is likely to produce a desired outcome, and the second phrase provides an indication of the values of a second field of the at least the first set of records, the second set of records, or the third set of records that suggest that the performance of the action based on the knowledge associated with the CRM record data is likely to produce the desired outcome.

14. The method of claim 6, wherein the modifying the first set of data to produce the second set of data comprises adding at least one second field to at least one of the first set of records, the second set of records, or the third set of records, and at least one value of the at least one second field corresponds to the indication.

15. The method of claim 6, wherein the modifying the first set of data to produce the second set of data comprises excluding, in response to the indication, at least one second field from at least one of the first set of records, the second set of records, or the third set of records.

16. The method of claim 1, wherein the indication comprises a Boolean value.

17. The method of claim 1, wherein:

the message further includes a scale; and the indication comprises a rank on the scale.

18. The method of claim 1, wherein the causing the machine learning system to be trained comprises causing, in response to a variable being equal to or greater than a threshold value, the machine learning system to be trained.

19. The method of claim 18, wherein at least one of:

the signal comprises a plurality of signals, the variable comprises a count of the signals, and the threshold value comprises a specific number of signals;

the action comprises a plurality of actions, the variable comprises a count of undesired outcomes in response to performances of the actions, and the threshold value comprises a specific number of undesired outcomes; or the transmitting the CRM record data occurs at a specific time, the variable comprises a duration of time after the specific time, and the threshold value comprises a specific duration of time.

20. The method of claim 1, wherein the causing the machine learning system to be trained comprises conveying, to another processor, the second set of data, the second set of data to be used by the other processor to train the machine learning system.

21. The method of claim 1, wherein the causing the machine learning system to be trained comprises training, using the second set of data, the machine learning system.

22. A non-transitory computer-readable medium storing computer code for modifying a set of data for training a machine learning system, the computer code including instructions to cause the processor to:

cause the machine learning system to be trained using a first set of data;

determine, by the machine learning system, to transmit, to a user device, customer relationship management (CRM) record data from a plurality of sales leads;

transmit, to the user device, a message, wherein the message includes an explanation of the determination, by the machine learning system, to transmit the CRM record data from among the plurality of sales leads;

receive, from the user device, a signal, wherein the signal includes an indication of a usefulness of the message to a user of the user device, in making a decision to perform an action based on a knowledge associated with the CRM record data;

modify, in response to a receipt of the signal, the first set of data to produce a second set of data; and cause the machine learning system to be trained using the second set of data.

23. A system for modifying a set of data for training a machine learning system, the system comprising:

a memory configured to store a message, a plurality of sales leads, a first set of data, a signal, and a second set of data; and a processor configured to:

cause the machine learning system to be trained using the first set of data:

determine by the machine learning system to transmit, to a user device, customer relationship management (CRM) record data from among the plurality of sales leads;

transmit, to the user device, the message, wherein the message includes an explanation of the determination, by the machine learning system, to transmit the CRM record data from among the plurality of sales leads;

receive, from the user device, the signal, wherein the signal includes an indication of a usefulness of the message to a user of the user device, in making a decision to perform an action based on a knowledge associated with the CRM record data;

modify, in response to a receipt of the signal, the first set of data to produce the second set of data; and cause the machine learning system to be trained using the second set of data.

* * * * *